Patented Apr. 16, 1929.

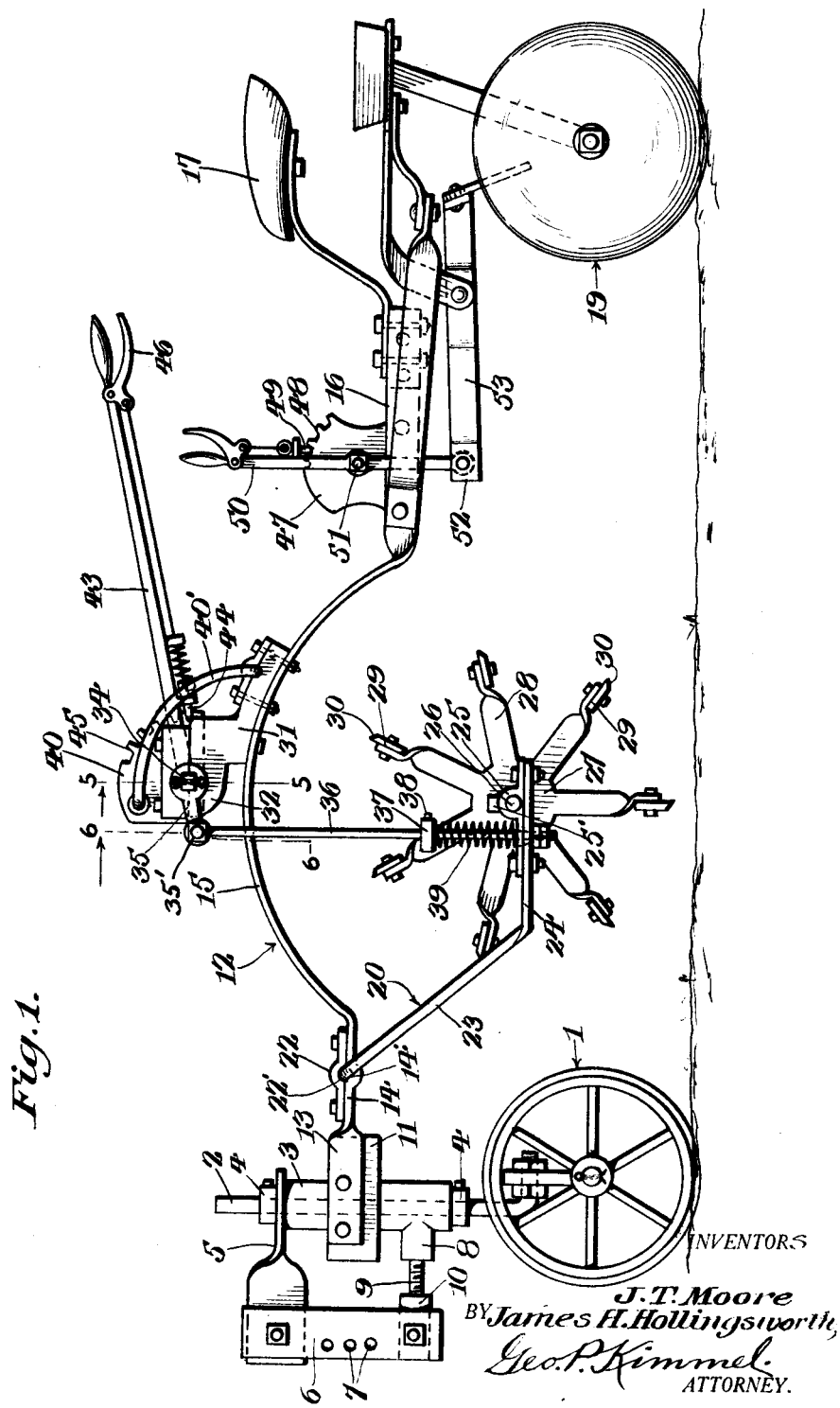

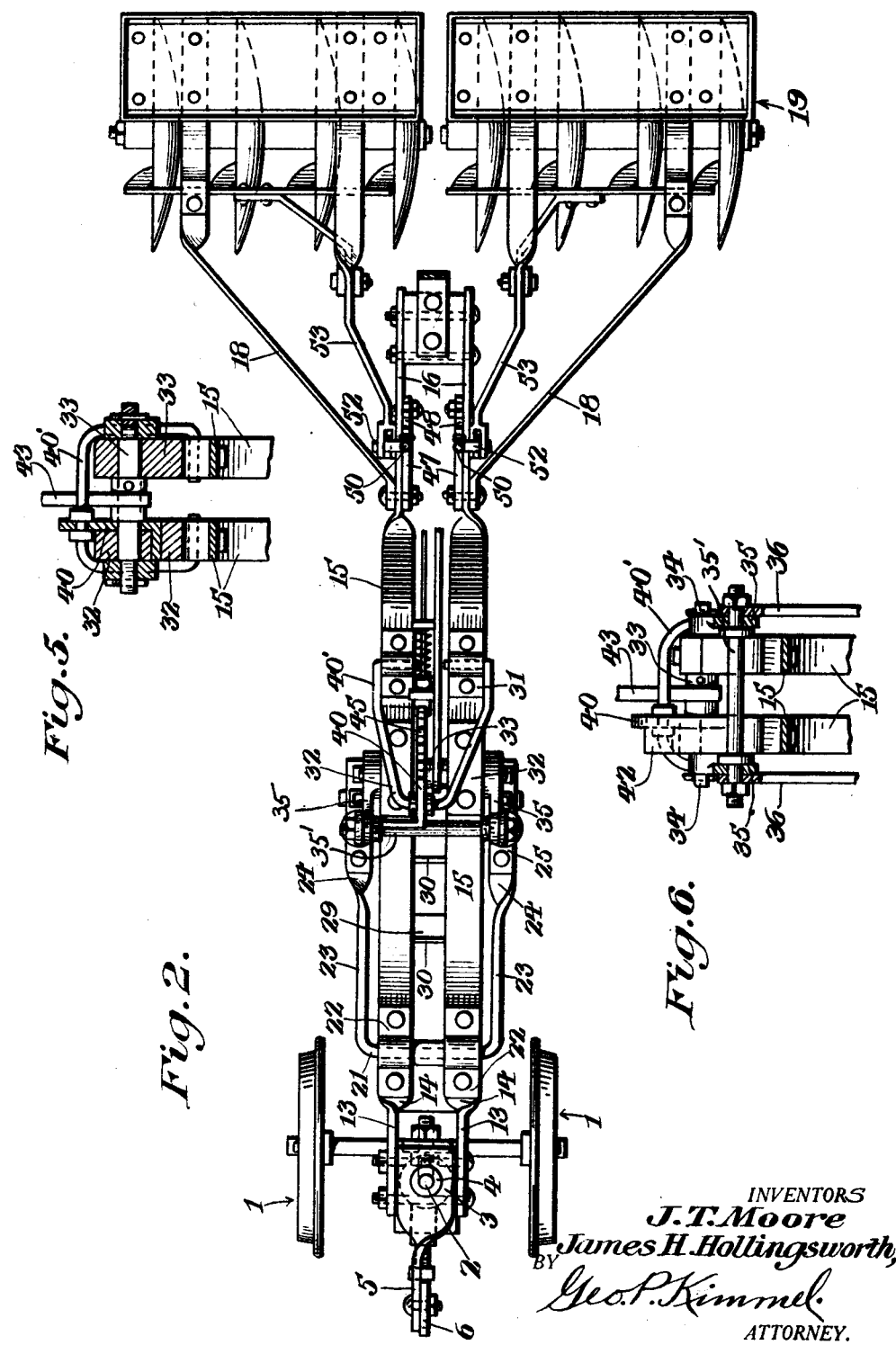

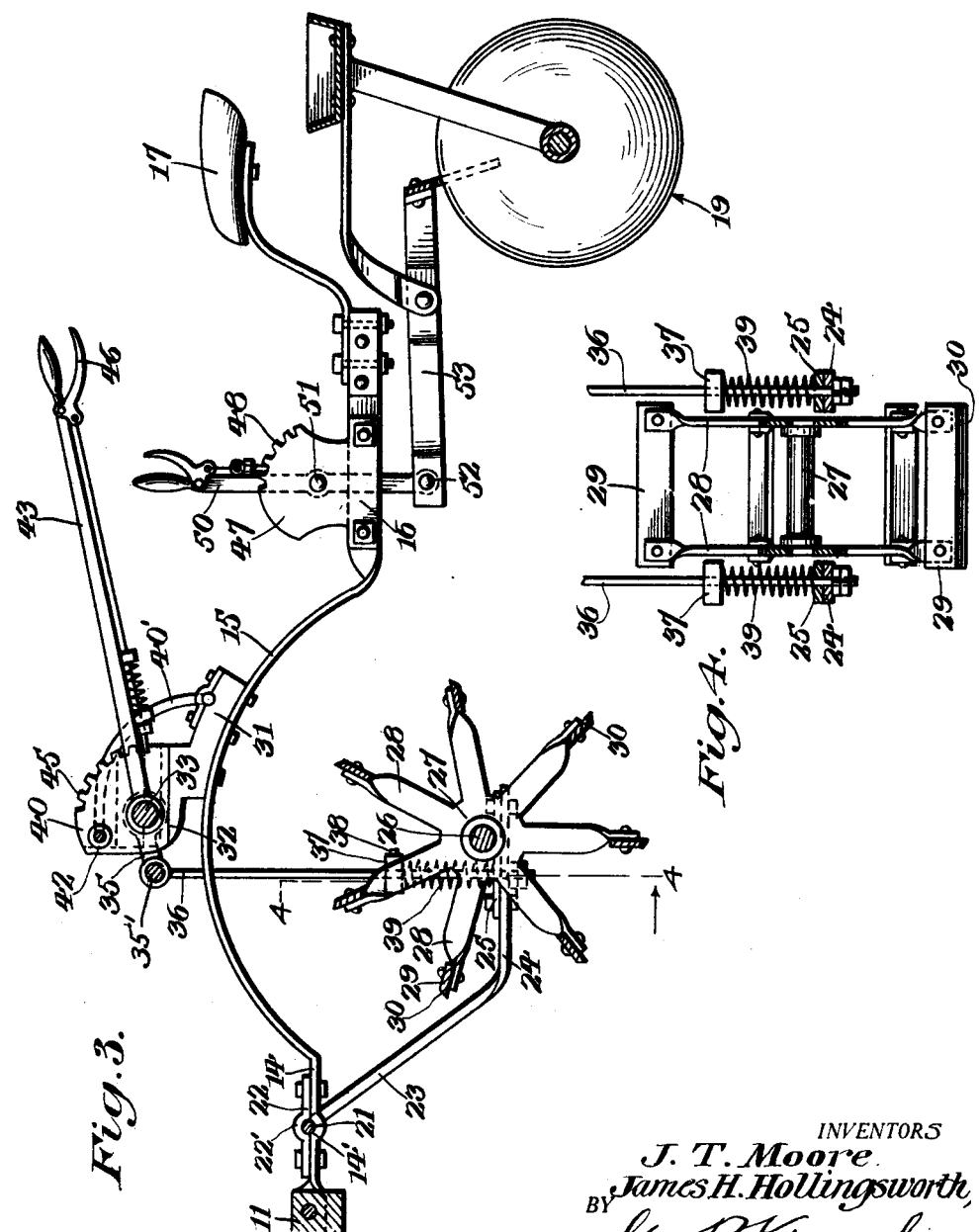

1,709,679

UNITED STATES PATENT OFFICE.

JOHN T. MOORE AND JAMES H. HOLLINGSWORTH, OF BOOTHSPOINT, TENNESSEE, ASSIGNORS OF ONE-THIRD TO J. T. FREEMAN, OF FINLEY, TENNESSEE.

STALK-CUTTER ATTACHMENT.

Application filed May 23, 1928. Serial No. 279,943.

This invention relates to stalk cutter attachments for farming implements, more particularly to stalk cutter attachments for disc harrows, and has for its primary object to provide an improved and novel means, as hereinafter set forth, whereby the stalks in a field may be cut in relatively short lengths and deposited in the path of the implement to which the stalk cutter is attached.

A further object of the invention is to provide a stalk cutter for the purpose as above set forth, including a supporting frame by means of which the stalk cutter may be operatively attached between the forward truck and disc gangs of a disc harrow, whereby the propelling means for the disc harrow may be utilized for propelling the stalk cutter.

A further object of the invention is to provide a stalk cutter in a manner as hereinafter set forth, including a supporting frame adapted for connection with the frame of a disc harrow, and further including means whereby a cutter reel may be adjustably suspended from the supporting frame to ride the ground in front of the disc gang of the harrow.

Other objects and advantages will be apparent during the course of the following description.

In the accompanying drawings in which like numerals are employed to designate like parts throughout the same:—

Figure 1 is an elevation of a stalk cutter attachment for disc harrows constructed in accordance with this invention, and showing a disc harrow in assembled relation thereto.

Figure 2 is a top plan view of the embodiment shown in Figure 1.

Figure 3 is a central longitudinal vertical section through the same.

Figure 4 is a section taken on line 4—4 of Figure 3.

Figure 5 is a section taken on line 5—5 of Figure 1.

Figure 6 is a section taken on line 6—6 of Figure 1.

In the drawings wherein for the purpose of illustration is shown an embodiment of the invention, the numeral 1 designates generally a forward truck, to the axle of which is secured a vertically extending member 2, upon which is slidably mounted a sleeve 3. Adjusting means, such as the set screw block 4, is provided whereby the sleeve 3 may be adjusted longitudinally of the member 2. Secured to the sleeve 3 and projecting forwardly therefrom, is a bracket 5, upon which is supported a draw bar 6, provided with spaced perforations 7, by means of which the draw bar may be connected with a pulling apparatus, which may be propelled either by horse power or motor power.

Formed on the sleeve 3, is a laterally disposed, forwardly extending boss 8, which is provided with a threaded bore extending longitudinally therethrough and into the interior of the sleeve 3. A bolt 9 is threaded through the boss 8 into engagement with the member 2, to further secure the sleeve 3 in position. The bolt 9 is formed with a forwardly extending block extension 10, to which the draw bar 6 is also secured. A connecting block 11 is loosely swiveled on the sleeve 3, to permit the block 11 to slide freely on the sleeve 3, between the boss 8 and the bracket 5. Secured to the block 11 is a pair of flat beams, indicated generally at 12, said beams comprising the supporting frame for the cutter. The forward portions 13 of the beams are disposed respectively with their flat faces against the lateral faces of the block 11, and with their edges disposed to the vertical. Rearwardly of the block 11, the beams are twisted 90° and extend horizontally to form the yoke bearing portion 14. From the portion 14, the beams extend upwardly and rearwardly in an arc, as at 15, the arc terminating in a plane below the horizontal plane of the portion 14. From the rearward end of the arc 15, the beams are again twisted 90°, and extend horizontally to form the rearward portion 16, upon which the seat 17 is supported, and to which is connected the frame member 18 of the disc gang, indicated generally at 19.

Formed in the horizontal portion 14, are transversely extending, aligned grooves 14', to form bearings for yoke indicated generally at 20. The yoke 20 is formed with a forward, horizontal portion 21, which is seated in the grooves and projects above the upper surface of the portions 14. The yoke portion 21 is held in position by means of a bearing cap 22 mounted on the upper face of each of the portions 14, said caps being formed with grooves 22' which are opposed to the grooves 14' to receive the upper surface of the yoke portion 21 therein.

From the forward horizontal portion 14, the yoke extends rearwardly and downwardly at an angle to form the portion 23, which terminates in the flat, horizontally extending, free end portion 24. Supported on the portion 24, are the bearing blocks 25, in which is journaled a shaft 26, upon which is mounted a cutter reel. Each bearing block is provided with a grease cup 25'.

The cutter reel comprises an axially bored hub 27 through which the shaft 26 extends, and from either end of which extends a series of radially disposed arms 28. The arms 28 on one end of the hub respectively are in alignment with the arms on the opposite end of the hub, with respect to the axial direction of the hub. Connecting each pair of aligned arms, adjacent the ends of the arms, is a knife 29, which is formed with a beveled outer edge 30, for the purpose of providing the knife with a cutting edge.

Supported on the arc portions 5 of the beams, rearwardly of the transverse median thereof, are supporting blocks 31, which are formed with forwardly extending arm portions 32, which are spaced a substantial distance from the beams. The portions 32 are provided with transversely extending, aligned bores, to rotatably receive therein a stub-shaft 33. The ends of the shaft 33 are squared, as at 34, to provide immovable connecting means with the links 35. Pivotally connected to the forward ends of the links 35 is a rod 35', common to both links, and pivotally connected to the rod, and depending therefrom, are the vertically disposed rods 36, which are secured at their lower ends to the portion 24 of the yoke 20. Slidably mounted on each of the rods 36, is a stop block 37, which is provided with a set screw 38 extending through the walls of the blocks into engagement with the rods 36. A spring 39 is coiled around the rods 36, the ends of the spring respectively being in abutment with the lower surface of the stop block 37 and the upper surface of the bearing block 25. Thus it will be seen that the yoke 20 is pivotally supported by the portions 14 of the beams, and also pivotally and yieldably suspended from the links 35.

Secured to one of the arm portions 32, is a rack 40, having a disposed flange 41 extending transversely into the arm portions 32, and having a vertically disposed flange 42 extending transversely of the arm portions 32, at the forward edge thereof. Fixedly secured to the shaft 33, is a lever 43, which is provided with a spring actuated pawl 44 for engagement with the teeth 45 formed on the rack 40, and which is provided with a pawl actuating member 46 adjacent the free end thereof. A yoke 40' connects the rack with the beams to brace the rack.

Mounted on the horizontal portion 16 of each of the beams, is a rack 47, which is provided with teeth 48 for engagement with the pawl 49 of the lever 50. The lever 50 is fulcrumed as at 51 to the rack 47, and its free end is pivotally connected as at 52 to the disc gang adjusting arm 53. The free ends of the lever 50 and 43 are disposed in proximity to each other, to be within ready reach of the operator of the implement.

When it is desired to operate the attachment, the cutter reel is adjusted by means of the lever 43 to rest on the ground and is rotated by frictional contact therewith. The relative adjustment between the cutter reel and the gang disc may be had by means of the levers 43 and 50 respectively. When the cutter reel comes in contact with an unyielding surface, such as a rock, the springs 39 are compressed to permit an upward movement to the cutter reel to clean the obstruction.

It is to be understood that the form of my invention herein shown and described is to be taken as a preferred example of the same, and that various changes in the size, shape and arrangement of parts may be resorted to without departing from the spirit of the invention or the scope of the appended claims.

What we claim is:

1. A stalk cutter attachment for farm implements comprising, a pair of supporting beams adapted for connection at their forward ends with a forward truck assembly, a yoke carried by the beams, said beams including horizontal portions provided with means for pivotally supporting the yoke, said beams further including arc portions, supporting blocks carried by the arc portions and formed with forwardly projecting arm portions spaced from said beams, a shaft rotatably mounted on said arm portions, a link and a lever fixedly secured to the shaft, rods pivotally connected with the link and provided with means to yieldingly support said yoke, said beams further including horizontally extending rear end portions adapted for connection with a disc gang, and a cutter reel rotatably mounted on said yoke.

2. A stalk cutter attachment for farm implements comprising, a pair of supporting beams adapted for connection at their forward ends with a forward truck assembly, a yoke carried by the beams, said beams including horizontal portions provided with means for pivotally supporting the yoke, said beams further including arc portions, supporting blocks carried by the arc portions and formed with forwardly projecting arm portions spaced from said beams, a rack immovably mounted on one of said arm portions, a shaft disposed between the arm portions and journaled therein, a lever fixedly secured to the shaft and having a pawl for engagement with the rack, the ends of said shaft being squared and projecting laterally from the outer faces of said arms, links formed with squared apertures to receive said squared ends therein, rods pivotally connected with the links and provided with means for yieldingly supporting said yoke, said beams further including horizontally extending rear end portions adapted for connection with a disc gang, and a cutter reel rotatably mounted on said yoke.

In testimony whereof, we affix our signatures hereto.

JOHN T. MOORE.
JAMES H. HOLLINGSWORTH.